Figures 8, 10:
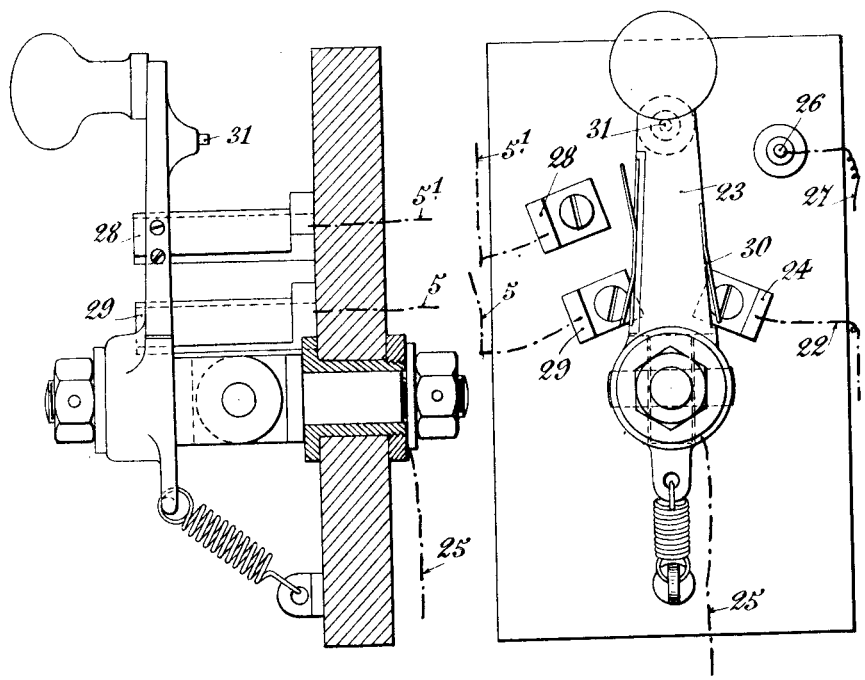

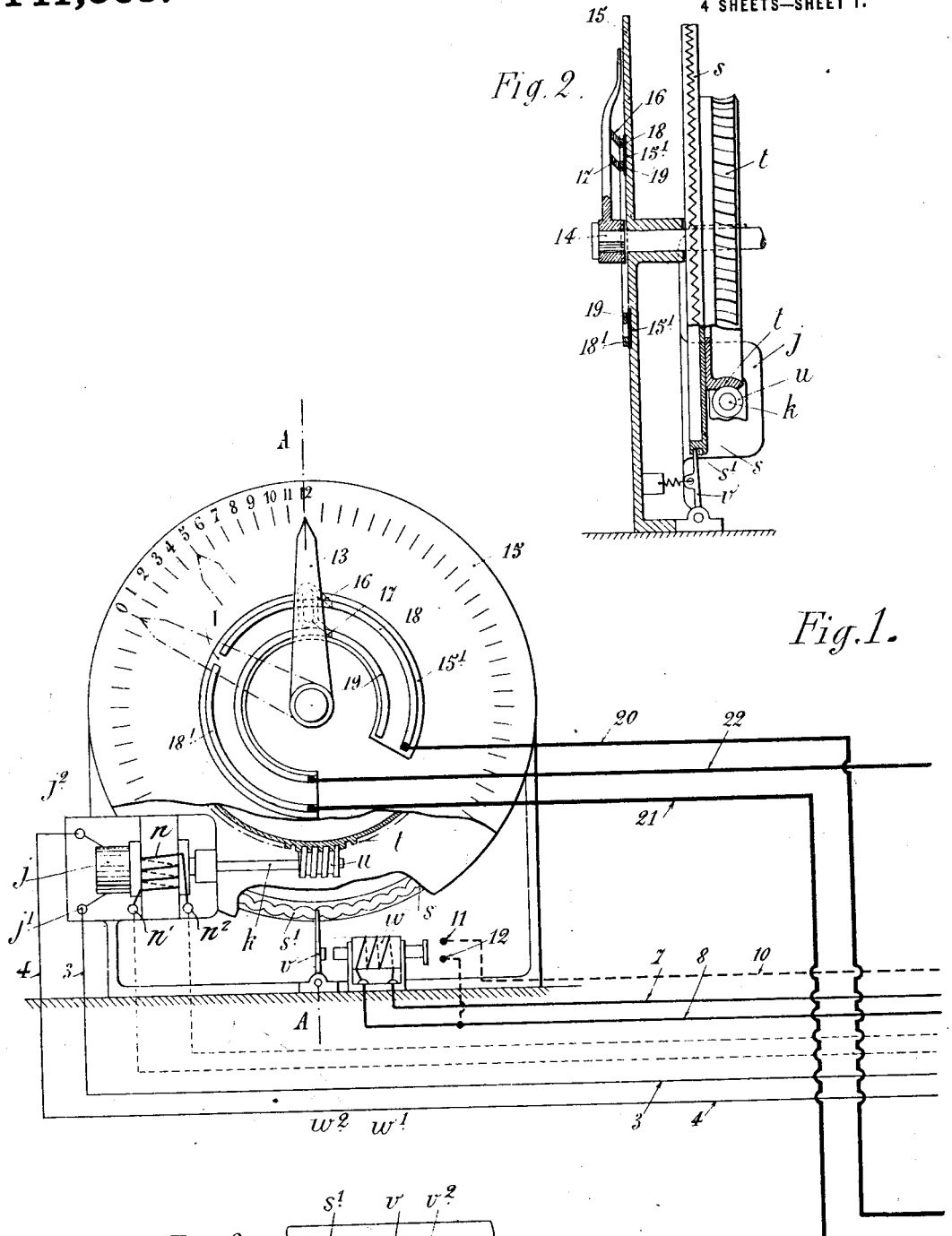

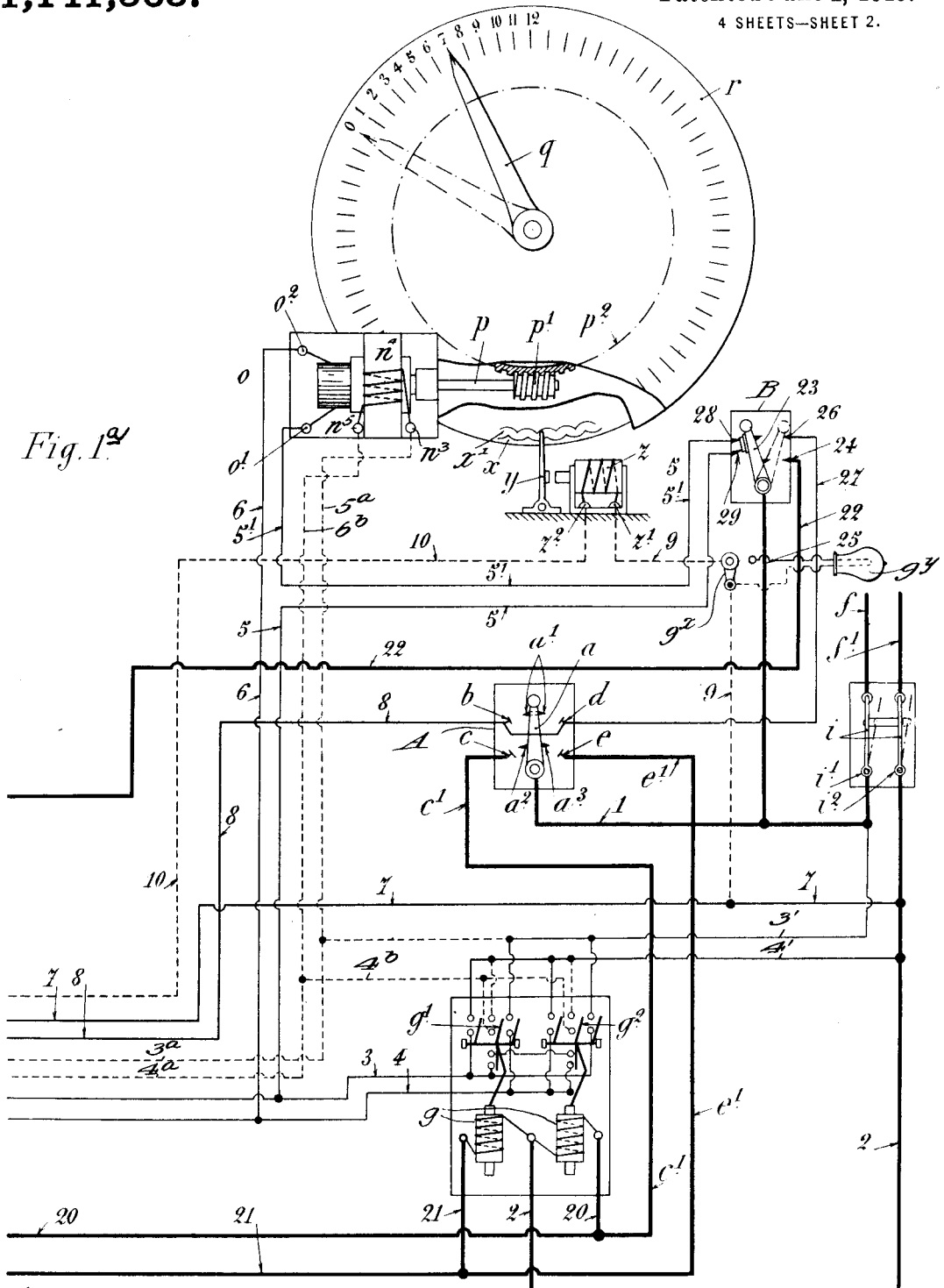

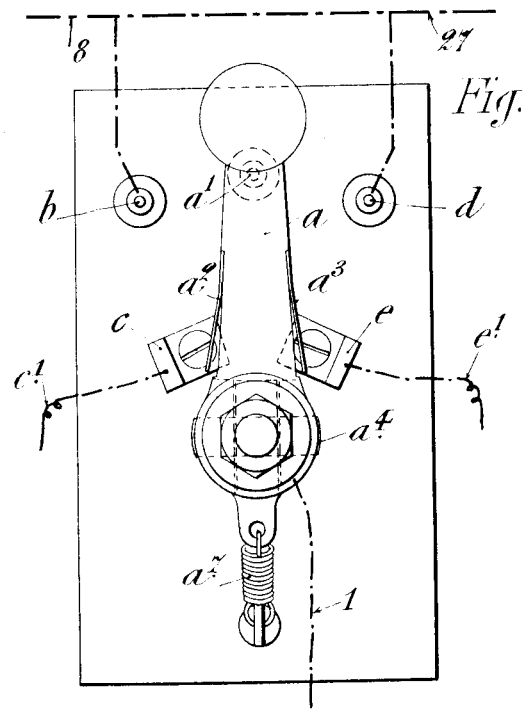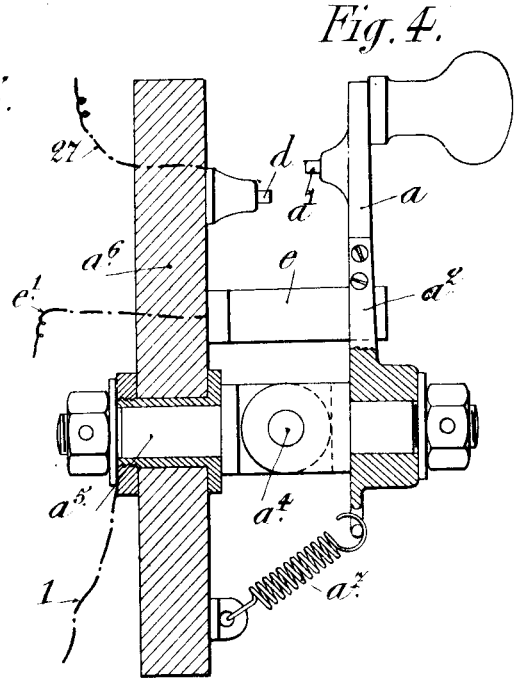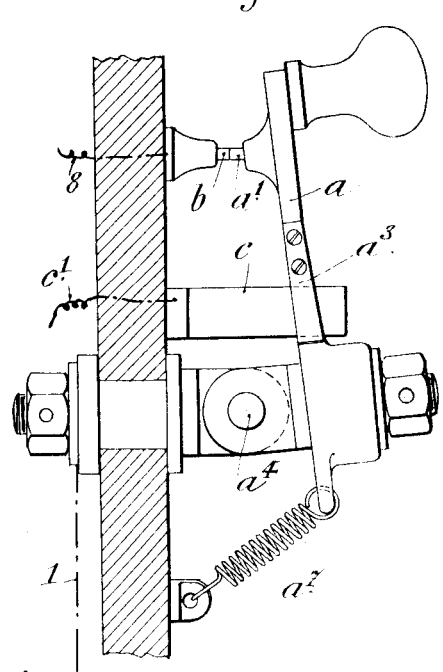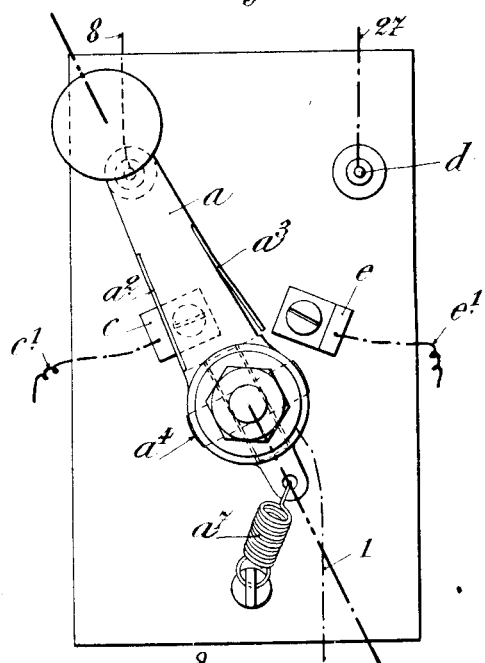

E. SCHNEIDER.
INSTALLATION PERMITTING OF ELECTRICALLY ACTUATING APPARATUS AT A DISTANCE FROM A CENTRAL STATION.
APPLICATION FILED MAR. 23, 1911.

1,141,363.

Patented June 1, 1915.

4 SHEETS—SHEET 4.

Witnesses:
R. C. Fitzhugh
E. E. Warfield

Inventor:
Eugène Schneider
by
Mauro, Cameron, Lewis & Massie
Attys.

UNITED STATES PATENT OFFICE.

EUGÈNE SCHNEIDER, OF LE CREUZOT, FRANCE.

INSTALLATION PERMITTING OF ELECTRICALLY ACTUATING APPARATUS AT A DISTANCE FROM A CENTRAL STATION.

1,141,363.

Specification of Letters Patent. Patented June 1, 1915.

Application filed March 23, 1911. Serial No. 616,457.

*To all whom it may concern:*

Be it known that I, EUGÈNE SCHNEIDER, citizen of the Republic of France, residing at Le Creuzot, Saône-et-Loire, France, have invented certain new and useful Improvements in Installations Permitting of Electrically Actuating Apparatus at a Distance from a Central Station, of which the following is a specification.

Installations permitting of electrically actuating an assemblage of parts or apparatus at a distance from a central station such as the back sights of guns or movable indexes indicating to the various marksmen the displacement that they should give to their back sight, are known. In installations of this kind (see Lohay's British Patent No. 14,431 of the 7th July, 1908) the operating electric motors arranged in the several receiving stations have been combined with other motors controlled by the former for example by the intermediary of an electro-mechanical escapement; these controlled motors operating an apparatus such as a hand moving in front of a dial and which controls the exact transmission of the order given. Now it may happen that for some reason, such as a defect in mounting or resumption of operations at a receiving station temporarily isolated, there is an absence of agreement in position between the operated part and the controlling part in such a manner that the indications at the receiving stations and at the transmission station no longer agree.

The present invention has for its object a device interposed in the installations of the type indicated for enabling the operator at the transmission station to determine at any time whether the desired agreement exists and to reëstablish it if it should be interrupted.

The invention consists broadly in establishing between the controlled part at the receiving station and the repeating member at the transmitting station a circuit which can be broken or made at will by means of a suitable controller. When this circuit has been established it is broken automatically when the operated part reaches a given position of agreement or of verification owing to a break formed at this point in the conductor. The operator at the transmitting station thus recognizes whether agreement exists or not by bringing the repeating apparatus into the position for producing agreement and ascertaining whether at this moment the auxiliary circuit is broken at the receiving station as it should be. If, on the other hand, the operated part is not as it should be in agreement with the repeating part, the auxiliary circuit is not broken and the operated part continues to be operated until the moment at which it reaches the position of agreement; at this moment the auxiliary circuit is broken which is indicated to the operator at the transmitting station by an acoustic, visual or other signal, and the parts are brought into agreement.

Figure 9:
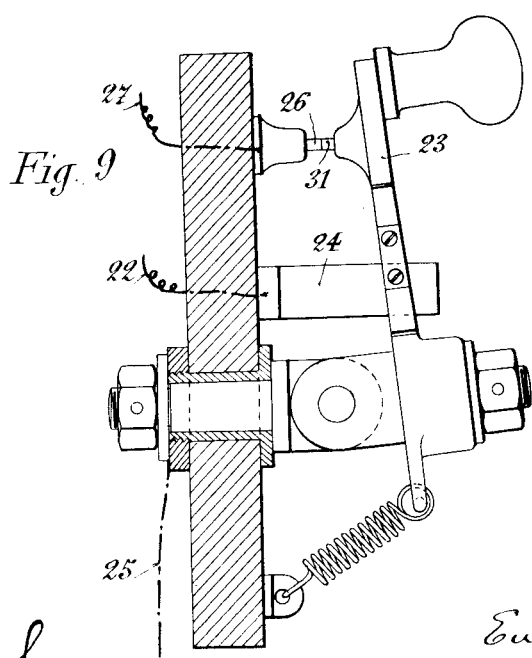

Figures 1 and 1$^a$ of the accompanying drawing represent diagrammatically by way of example an installation comprising the device for bringing the parts into agreement which forms the object of the invention. Fig. 2 is an elevation partly in section on the line A—A in Fig. 1. Fig. 3 is a partial detail plan of the electro-mechanical escapement combined with the motors and which insures the progressive and uniform operation of the controlled parts. Fig. 4 is a side view, partly in section, of a primary controller. Figs. 5 and 6 are plan views of the same controller showing the switch member in different switching positions. Fig. 7 is a side view of the controller, partly in section, showing the switch member in closed position. Fig. 8 is a plan view of a secondary controller; and Figs. 9 and 10 are side views of the same, partly in section, showing different positions of the parts.

The installation comprises in the known manner a transmitting station where a controller A is installed; a special constructional form of this controller is represented in detail in Figs. 4 to 7 inclusive. By means of a conductor 1 this controller is connected with one of the terminals $i'$ of a main switch, the switch members $i$ of which are pivoted at terminals $i'$, $i^2$ and are arranged to connect with the bars $f\,f'$ connected with the source of current. The other terminal $i^2$ of this switch is connected by a conductor 2 to the windings $g$ of the electro-magnets of a double switch $g'$, $g^2$. Each of these switches is connected by the wires 3, 4 with the terminals $j'\,j^2$ of the motor $j$ serving for the control at a distance of the shaft $k$ at the receiving station. One of the switches $q'$ is intended for placing the motor $j$ in circuit for running in one direction and the other switch $q^2$ for running in the opposite direction. By means of branch lines 5, 5' and 6 from the conductors 3, 4 the terminals of the motor $j$ are connected with the terminals $o'$ $o^2$ of a motor $o$ actuating a shaft $p$ at the transmitting station in such a manner that the movements electrically transmitted to the shaft $k$ are repeated at the transmitting station for example by a hand $q$ moving in front of a dial $r$ and receiving the movements of the shaft $p$ through a screw $p'$ and worm wheel $p^2$.

The uniform and progressive running of the motor $j$ is insured by an electro-mechanical escapement. This escapement is constituted, for example, by a disk $s$ integral with the driven member; in the present instance the worm wheel $t$ meshes with a screw $u$ mounted on the shaft $k$ and said disk $s$ is provided on its periphery with a sinuous groove $s'$, in which there engages a finger $v$ pivoted to a frame and forming the armature of an electro-magnet $w$. The terminals $w'$ $w^2$ of this electro-magnet are connected by the conductors 7, 8 respectively with the main conductor 2 and with a contact $b$ of the controller $a$. A similar electro-mechanical escapement regulates the movements of the motor $o$. It comprises a disk $x$ with sinuous groove $x'$ in which there moves a finger $y$ forming the armature of an electro-magnet $z$.

In order to establish mutual control between the motor $o$ and the motor $j$, the electro-magnet $z$ is energized by impulses transmitted by means of the movable core of the electro-magnet $w$. With this object in view, the terminal $z^2$ is directly connected with terminal 11 through conductor 10 and terminal $z'$ is connected through conductors 9, 7, winding $w$ and conductors 8, 8' with terminal 12. When the core of winding $w$ makes contact with terminals 11, 12, the above circuits are closed at contacts 11, 12 and switch contact $b$. Current from the mains $f$, $f'$ then energizes the windings of magnet $z$.

In the example illustrated, the distant control member is assumed to be a hand 13 keyed upon the shaft 14 which carries the wheel $t$ and the escapement disk $s$ integral with the latter. This hand moves in front of a graduated dial 15. The part repeating the movements transmitted to the hand 13 is the hand $q$ moving in front of the dial $r$ as stated above.

The device which forms the object of the invention enables the operator at the transmitting station at any time to make the positions of the hands 13 and $q$ agree if owing to defective fitting or at the beginning of operations this agreement should be disestablished. Between the controlled part, that is to say the hand 13 and the tell-tale hand $q$ an auxiliary circuit is provided for this purpose. The hand 13 carries two conducting brushes 16, 17 movable respectively over two contacts 18, 19 forming segments of circles and which may be fixed to the dial 15 by the intermediary of an insulating plate 15'. The contact 18 presents a break at a point I situated, for example, opposite the zero of the graduation of the dial 15 and the two parts 18, 18' of the said contact are connected by the conductors 20, 21 respectively to the two switches $g^2$, $g'$ which are themselves connected by the conductors $c'$ $e'$ respectively to the contacts $c$ and $e$ of the controller A. The contact 19 is connected by a conductor 22 to one of the contacts 24 of a second controller B for producing agreement. This controller, the lever 23 of which is connected by a conductor 25 to the main wire 1, is represented in detail in Figs. 8, 9 and 10. In addition to the contact 24, it comprises a contact 26 with which the lever 23 is able to contact simultaneously and which is connected by a conductor 27 to the contact $d$ of the controller A, this contact $d$ being itself connected like the contact $b$ to the electromagnet $w$ by means of the conductor 8.

The lever 23 of the controller B normally forms a bridge (that is to say in the position indicated in full lines in Fig. 1ª) between the two lengths of conductor 5 and 5' in such a manner that in point of fact it forms a switch for placing the motor $o$ in circuit or cutting it out of circuit. With this object the two lengths of wire 5 and 5' end at the two contacts 28 and 29 of the said controller.

The controller A is represented in its normal position or position of repose in sectional elevation and in plan respectively in Figs. 4 and 5; Figs. 6 and 7 show in plan and in elevation the same controller in the position that it occupies for actuation at a distance in one of the directions of running. The lever $a$ is pivoted by means of a fork around a pin $a^4$ carried by a pivot $a^5$ movable in the insulating bracket $a^6$. A spring $a^7$ normally holds the lever in the position shown in Figs. 4 and 5.

By rotating the lever $a$ toward the left hand for example, in such a manner as to bring its contact $a^2$ in contact with the contact piece $c$ the switch $g^2$ is operated over the circuit $f$, $i$, $i'$, 1, $a^2$, $c$, $c'$, 20, magnet $g$, 2, $i^2$, $i$ and $f'$, and places the motors $j$ and $o$ in circuit, which may be traced for motor $j$ as follows: $f$, $i$, $i'$, 3', switch $g^2$, conductor 3, motor $j$, conductor 4, switch $g^2$, 4', 2, $i^2$ and $f'$ and for motor $o$ over shunt circuit 5, 5'. The field circuit of motor $j$ is traced over conductors 3', 3ª, terminals $n'$, $n^2$, field magnet $n$, conductor 4ª, 4ᵇ, switch $g^2$, and 13ᵗ conductor 4', 2, $i^2$, and $f'$. Field circuit of motor $o$ is traced over shunt circuit 3', $5^a$, terminal $n^3$, field winding $n^4$, terminal $n^5$, conductors $6^a$, $4^b$, switch $g^2$ and conductor 4' back to switch $i$. If the lever $a$ were displaced toward the right hand in such a manner as to establish contact between the contact pieces $a^3$ and $e$ the motors $j$ and $o$ would be placed in circuit by the intermediary of the switch $g'$ for running in the opposite direction.

Although placed in circuit the motors $j$ and $o$ are normally locked by their electromechanical escapements $w$, $z$ which are adapted to be released by the key action of levers $a$ and 23 of controllers A and B. In order to operate the escapement of the motor $j$, it is only necessary to depress the lever $a$ (which has previously been placed upon the contact $c$ or $e$) in such a manner as to make contact between the contact pieces $a'$ and $b$ or $a'$ and $d$. The current follows the circuit $f$, $i$, $i'$, 1, $a$, $a'$, $b$, 8, $w$, 7, 2, $i^2$ and $f'$. At each similar contact and subsequent break, the electro-magnet $w$ actuates the finger $v$ which passes from one tooth to the other of the sector $s'$ occupying in succession the positions $v$, $v'$, $v^2$ (Fig. 3). In Figs. 1 and $1^a$ the sector $s'$ has been diagrammatically indicated by a sinusoidal groove in the side of the disk $s$. At each return movement of the core of the magnet $w$ the said core forms a bridge between the contacts 11 and 12 and thus places the electro-magnet $z$ of the escapement of the transmitting station in circuit, thereby enabling the motor $o$ to rotate in such a manner as to cause the hand $q$ to repeat the movements executed by the controlled part 13. This circuit may be traced as follows: $f$, $i$, $i'$, 1, $a$, $a'$, $b$, 8, contacts 12, 11 through core of magnet $w$, conductor 10, winding of magnet $z$, conductors 9, 7, 2, post $i^2$, switch arm $i$ and main $f'$. At any moment and particularly before transmitting a first order the operator at the transmitting station can verify if the indications of the hands 13 and $q$ agree and if the contrary is the case he can produce such agreement. Therefore, assuming that the positions of the two hands do not correspond, the hand $q$ being situated on the division 7 for example, while the hand 13 is opposite the division 12 on the dial 15 the operator proceeds as follows: Assume main switch $i$ is closed and lever $a$ of controller A is turned into its left-hand position. Lever $a$ is depressed seven times, thereby sending seven impulses through magnet escapements $w$ and $z$ and releasing motors $j$ and $o$ seven times to step their hands 13 and $q$ around to the 5 position on the dial 15 and to the 0 position on dial $r$. The circuits are the same as previously traced. When this is accomplished, lever $a$ is turned to its central position, as indicated, on controller A, and lever 23 of controller B is turned into its right-hand position, thereby closing the break between conductors 25 and 22 by bringing contact 30, Fig. 8, against contact 24. The circuit through motor $o$ is at this time broken at 28 and 29 in conductors 5, 5'. Turning lever 23 into the right-hand position serves to create the following circuit: $f$, $i$, 25, 23, 24, 22, 19, 17, 16, 18 (or 18' according to the actual position of the hand) and respectively 20 or 21, the switch $g^2$ or $g'$, 2, $i$, $f'$. The motor $j$ is thus switched in circuit while the motor $o$ remains cut out.

In order to check whether agreement exists, the operator actuates the controller lever 23 to cause it to rock in such a manner as to bring the knob 31 in contact with the contact piece 26 (Fig. 9) at which the conductor 27 ends. Each time the parts 26 and 31 are similarly brought into contact, an impulse is transmitted to the electromechanical escapement $w$ $v$ through the following circuit: $f$, $i'$, 25, 23, 31, 26, 27, $d$, $b$, 8, $w^2$, $w$, $w'$, 7, 2, $i^2$, $f'$.

The motor $j$ in operating rotates the part 13 causing the brushes 16, 17 to slide over the circular contacts 18, 19.

When the part 13 reaches the zero of the scale, that is to say, at the precise moment at which agreement between the indications is reëstablished, the brush 16 is situated at I opposite the break between 18 and 18'. The circuit, including the contacts 18 and 18' and 19 and magnets $g$, is broken and thereby deënergizes the latter and permits switch $g'$ or $g^2$ to open and break the motor circuit above traced, including motor $j$. The two hands $g$ and 13 are now at zero.

It has been assumed that disagreement existed between the positions of the hands. The existence of such disagreement is readily revealed to the operator at the transmitting station. As the arrival of the hand $q$ at zero should normally coincide with the arrival of the hand 13 at zero, it is only necessary to bring the hand $q$ to zero and to ascertain whether the operation of the controller lever 23 places the motor $j$ in circuit; which is equivalent to saying that the brush 16 is upon a conducting part of the circular contact 18—18'. In this case, the motor $j$ being driven, the escapement $z$—$y$ acts owing to the impulses transmitted by the electro-magnet $w$ and the noise of the oscillations of this escapement reveals the displacement of the hand 13. The cessation of this noise corresponds to the arrival of the hand 13 at zero, that is to say, the establishment of agreement.

It will of course be understood that the running of the motor $j$ during the stoppage of the motor $o$ resulting from defective agreement might be revealed if desired by an auxiliary signal such as a bell or a telltale lamp branched from the wire 9. For this purpose, a two point switch 9ˣ is provided in line 9, to the terminals of which is connected a lamp 9ʸ which may be switched in or out as desired for signal purposes.

In the example described, it has been assumed that the part operated was merely an indicating hand. As indicated in the preamble, however, the shaft 14 might of course serve as a direct or indirect transmission shaft for driving a mechanism of any kind, such as the back-sight of a gun, a liquid distributer, a regulating member and so forth.

What is claimed is:—

1. In a system of the character described, the combination of an indicator at a transmitting station and another indicator at a receiving station, a motor associated with each for operating said indicators, electric circuits for said motors, another circuit for controlling the receiving station motor circuit independently of the transmitting station motor and having terminals controlled by a movable contact adapted to open the controlling circuit and stop the last-named motor at a predetermined position of said contact.

2. In a system of the character described, the combination of an indicator and a driven-member, a motor associated with each, an interrupted conductor associated with said driven-member, a contact movable with said driven-member engaging said interrupted conductor and breaking the circuit of said driven-member motor when it reaches the interrupted part of said conductor, means connecting said motors in circuit with a source of current, and means for cutting out of circuit the motor associated with said indicator.

3. In a system of the character described, the combination of an indicator and a driven member, a motor associated with each, a contact movable with said driven member, an interrupted conductor engaged by said contact, means connecting said motors in circuit with a source of current, means for cutting out of circuit the motor associated with said indicator, and means automatically breaking the circuit through the motor associated with said driven member when said contact reaches the interrupted part of said conductor.

4. In a system of the character described, the combination of an indicator and a driven member each provided with a driving motor and each having an escapement means for simultaneously operating said escapements, means for disconnecting said indicator motor, and other means for stopping said driven-member motor.

5. In a system of the character described, the combination of an indicator and a driven member, each provided with a driving motor and each having an electromagnetic escapement, electric circuits for operating said escapements, and means operated by one escapement for synchronizing the movements of said indicator and driven member.

6. In a system of the character described, the combination of an indicator and a driven member, each provided with an electric driving motor and each having an escapement, means for simultaneously operating said escapements, electric circuits for said motors, a manually operated switch for controlling the indicator motor circuit and a cut-out switch operating to open the circuit of the motor in the other circuit at a predetermined position of said driven member.

7. In a system of the character described, the combination of an indicator and a driven member, an electric motor and an electromagnetic escapement associated with each, and means operated by the driven member escapement and closing a circuit through the indicator escapement each time the former is actuated.

8. In a system of the character described, the combination of an indicator and a driven member, each provided with an electric driving motor and each having an escapement, means for simultaneously operating said escapements, electric circuits for said motors, a manually operated switch for controlling the indicator motor circuit, a cut-out switch operating to open the circuit of the motor in the other circuit at a predetermined position of said driven member, and a signaling device at the transmitting station in one of said circuits for the purpose described.

9. In a system of the character described, the combination of an indicator at the transmitting station and an indicator at the receiving station, a motor associated with each indicator, means connecting said motors with the source of current, an electromagnetic escapement associated with each indicator, means connecting the same with the source of current, and means closing the circuit through the escapement at the transmitting station through the operation of the escapement at the receiving station.

10. In a system of the character described, the combination of an indicator at the transmitting station and an indicator at the receiving station, a motor associated with each indicator, means connecting said motors with the source of current, an electromagnetic escapement associated with each indicator, means connecting the same with the source of current, and means for synchronizing the operation of said escapements.

11. In a system of the character described, the combination of an indicator at the transmitting station and an indicator at the receiving station, a motor associated with each indicator, means connecting said motors with the source of current, an electromagnetic escapement associated with each indicator, means connecting the same with the source of current, and means associated with the escapement at the receiving station for synchronizing the operation of said escapements.

12. In a system of the character described, the combination of an indicator at the transmitting station and a driven member at the receiving station, a motor associated with each, an electromagnetic escapement associated with each, and a controller operable to close the circuits through said motors and escapements and the source of current.

13. In a system of the character described, the combination of a motor driven indicator at one station provided with an electromagnetic escapement, a motor driven member at another station provided with an electromagnetic escapement, operating circuits for said motors and other operating circuits for said escapements, a controller operable to open and close the motor circuits and said escapement circuits and reversing switches in said motor circuits to determine the direction of rotation of said motors.

14. In a system of the character described, an indicator at the transmitting station comprising a dial and a pointer and a similar indicator at the receiving station, an electric motor and an electromagnetic escapement associated with each indicator, electric circuits for said devices, a switch for cutting in and out the transmission station motor and an electromagnetic switch controlling both motor circuits and a circuit having a winding in said last-named switch and controlled by the receiving station indicator and means at the receiving station for opening and closing the transmitting station escapement circuit.

15. In a system of the character described, an indicator at the transmitting station comprising a dial and a pointer and a similar indicator at the receiving station, an electric motor and an electromagnetic escapement associated with each indicator, electric circuits for said devices, another circuit having contacts controlled by the receiving station indicator, a switch for cutting in and out the transmission station motor and having contacts in said last-named circuit and other contacts in one of said escapement circuits, and means controlled by said indicator circuit for connecting and disconnecting said motor circuits with a source of current.

16. In a system of the character described, the combination of an indicator comprising a dial and a pointer at the transmitting station, an electric motor for moving one of said elements relatively to the other, a driven member at the receiving station, an electric motor connected to said member, an electromagnetic escapement associated with said driven member, a similar escapement associated with said indicator, means connecting said motors and escapements with a source of current, and means for synchronizing the operation of said escapements.

17. In a system of the character described, the combination of an indicator comprising a dial and a pointer at the transmitting station, an electric motor for moving one of said elements relatively to the other, a driven member at the receiving station, an electric motor connected to said member, an electromagnetic escapement associated with said driven member, a similar escapement associated with said indicator, a circuit adapted to be made and broken through the operation of said driven member, and means connecting said motor at the receiving station to the source of current by means of said circuit, said means also connecting the escapement at the receiving station with the source of current.

In testimony whereof I have affixed my signature in presence of two witnesses.

EUGÈNE SCHNEIDER.

Witnesses:
 BARTLEY F. YOST,
 R. DE SERCLINGER.